June 23, 1936. G. TANZI 2,045,421

MACARONI DIE

Filed Feb. 24, 1934

INVENTOR
GUIDO TANZI.
BY
Waldo M. Chapin
ATTORNEY

Patented June 23, 1936

2,045,421

UNITED STATES PATENT OFFICE 2,045,421

MACARONI DIE

Guido Tanzi, Brooklyn, N. Y., assignor to V. La Rosa & Sons, Inc., Brooklyn, N. Y., a corporation of New York Application February 24, 1934, Serial No. 712,738

4 Claims. (Cl. 107—14)

This invention relates to the fabrication of articles from macaroni dough, or from masses of material having the tough consistency and other characteristics of such dough.

A general object of the invention is to provide for the fabrication of a shell-like macaroni or noodle product presenting in compact space a hollow body portion of thin, easily-cooked sheet material, with flaring appendages or extensions of the body-shell joined to the ends of the body by deep constrictions or throats.

Another object of the invention is to produce a macaroni shell of the above-described novel contour with its body and both of its flaring ends formed with deep corrugations, the body corrugations being somewhat comparable to those of a melon, while the flaring ends present the appearance of frills or neck ruffles, each of these types of corrugation serving the desired purpose of presenting numerous crevices to entrain sauce, so that the desirably pronounced flavor imparted only by considerable quantities of sauce is ensured when this novel macaroni product is prepared for eating.

Another object of the invention is to provide means for the fabrication of this highly complex, novel, shell-like shape, with its deep corrugations and frills, by a simple process of extrusion requiring only a single, continuous step.

A cognate object is to provide a die with an extrusion orifice of novel shape, embodying cooperating elements which are in part the result of prolonged experimentation directed toward a given end, and are in part the result of demonstration by test of theories based upon observation of extrusion phenomena heretofore but little understood, some of the configural elements of the extruded product being of an unexpected and unpredictable character, although capable of reduplication to an indefinite extent, as desired, in pursuance of my invention.

Among other objects of the invention is the provision of a die for the above purpose which is simple to make, sturdy and wear-resisting in use, and easy to keep clean, lending itself also to high-speed fabrication of a multiplicity of the novel macaroni shells without the need for other than average mechanical skill.

The above, and other features of the invention, are illustrated and described fully in the accompanying drawing and specification and are pointed out in the claims.

Figure 1:
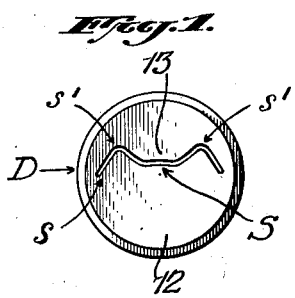
Fig. 1 is a plan view of a macaroni extrusion die in the formation of which this invention has been embodied, looking toward the obverse or extrusion face of the die.

In the embodiment of the invention selected for illustration and description, the part designated generally by the reference character D is a die-plug shown as a cup-shaped member having an open end 11 to which the charge of macaroni dough or like tough, plastic material may be introduced, the other end being closed by a wall 12 of substantial thickness, which is pierced by a slot designated generally by the reference character S, and which serves as an orifice through which to extrude, by suitably applied pressure, the dough which has been fed into the open, cup-shaped end 11 of the die-plug D.

In conventional practice, several die-plugs are mounted in a die-plate or disc (not shown), provided with recesses or sockets each corresponding in contour with the peripheral shape of the die-plug D, and this die-plate is fitted in the bottom of a press-cylinder which is then charged with dough, and a ram is moved into the cylinder to feed the dough forward against the die-plate and into the cavities 11 of the several die-plugs D, passing thence through the several extrusion orifices S.

In the present instance, I have provided the die-plug with an extrusion orifice adapted to extrude a broad strip of stock having the general configuration of a wide M this contour of the orifice at the extrusion face of the die showing clearly in Fig. 1, and it is to be noted that the middle portion of this M is quite extended and has a slightly arcuate shape, as shown at 13. It is also to be observed that the slot S is sensibly wedge-shaped in cross-section, being slightly larger at the extrusion face of the die than at the charging side thereof. This permits the dough to spread slightly after entering at the top, the effect being to cause a slight retardation of the material as it is extruded.

Figure 2:
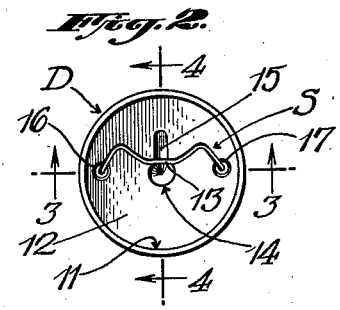
Fig. 2 is a similar view of the reverse, or charging end of the same die.
Figure 3:
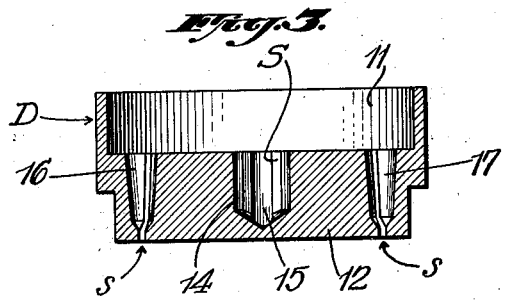
Fig. 3 is a view in transverse, vertical section on the line 3—3 of Fig. 2.
Figure 4:
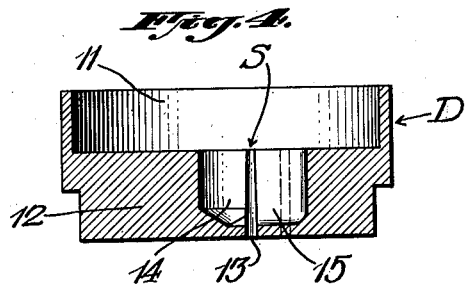
Fig. 4 is a similar section on the line 4—4 of Fig. 2, both Figs. 3 and 4 being taken on a larger scale.

At this middle region of the extrusion orifice, I have provided, in the reverse or charging side of the die, as shown in Fig. 2, an enlargement in the form of a keyhole slot or recess 14, the larger, or round portion of the recess 14 lying at one side of the arcuate portion 13, while the narrower portion 15 of this recess lies at the other side of the arcuate portion 13, both portions of this recess extending nearly through the end wall 12, as shown in Figs. 3 and 4, and both being in communication with the slot S throughout their extent.

My die is further characterized by the novel combination, with the distinctive middle extrusion features just described, of a plurality of lesser enlargements, 16 and 17, each of which is preferably of conical shape, as shown clearly in Fig. 3, and formed around an axis coincident with one of the extremities s of the slot S, as shown clearly in Fig. 2.

The conical enlargements 16 and 17 are shown as smaller in capacity than the circular portion 14 of the keyhole slot, and they extend very nearly through the wall 12, being in communication throughout their length with the slot-ends s, which portions of the slot may be slightly narrower than the "knees" of the slot, i. e., the bends s' intermediate the end portions and medial portion 13.

Figure 8:
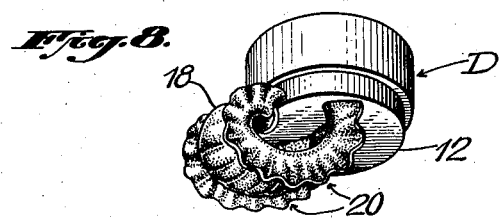
Fig. 8 is a view in perspective of the die of Figs. 1-4 with the dough in process of fabrication into the product of Figs. 5 to 8.

In the operation of die-plugs of the novel structure described, several of the die-plugs having been fitted in a die-plate (not shown) and the latter assembled in the conventional manner with the cylinder and plunger of a macaroni press, the dough will enter the cavity 11 of each die-plug when pressure is applied thereto, and the dough will be extruded from the extrusion slot S, in the manner illustrated in perspective in Fig. 8, the leading end of the extruded strip curling around toward the face of the die-plug as indicated, by reason of the larger amount of material and freer passage thereof afforded by the enlargement portion 14.

In this operation, the body or shell-like central portion 18 of the product is formed by that region of the slot between the bends s', and the corrugations 19, resembling those in a melon, are formed, in part at least, by the arcuate portion 13, and in part by slight retardation already described as resulting from the V-shaped cross-section of the extrusion slot S, which is best seen in Fig. 4; the flaring extension 20 at each end of the body is formed by that part of the slot between the end s and the "knee" or bend s' at that side, this bend in the slot forming the deep constriction 21 in the material which defines each end of the body, while the excess of material and freer passage provided by the end enlargements 16 and 17 already described, causes the frilled formation in the flaring ends 20, all of these phases of the unitary extrusion operation resulting in the formation of the type of article illustrated in Figs. 5 to 8 inclusive.

Figure 5:
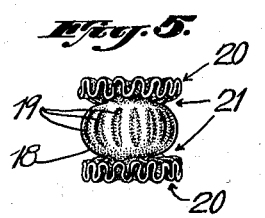
Fig. 5 is a view in side elevation of the novel extrusion product fabricated according to the present invention.
Figure 6:
Fig. 6 is a similar view looking in the reverse direction.
Figure 7:
Fig. 7 is a view in end elevation of the article of Figs. 5 and 6.

While there may be desirably some variation in proportion and contour provided for by suitable structural variations in the die-plug, it is to be noted that, after each completed article of macaroni has been severed (as by a suitable knife, not shown) in the conventional manner, and at the stage indicated in Fig. 8, it will present substantially the appearance shown in Figs. 5, 6 and 7, or may, if desired, be aided to assume a closely coiled effect (see Fig. 7), by rolling the articles loosely back and forth on a shaking screen, according to the method disclosed in my co-pending application, Serial No. 679,667, filed July 10, 1933, now Patent No. 1,969,589, dated Aug. 7, 1934.

The finished article, accordingly, possesses the characteristic complexity of surface requisite for entraining sauces and at the same time has a contour which facilitates complete penetration by the cooking fluid, while its appearance is distinctive and attractive, all of these qualities combining to render the novel product a toothsome viand.

I claim:

1. A die for extruding materials of the class described, comprising a cup-like body having an open end for charging, and having its other end closed by a wall provided with an extrusion orifice piercing said wall, said orifice being characterized by an elongated narrow slot, and said slot being further characterized by a relatively large enlargement substantially at the mid-point of its charging opening, and by relatively small enlargements at each end of the slot, the general contour of said extrusion slot from end to end being that of a very broad, rather flat M.

2. A die for extruding materials of the class described, comprising a cup-like body having an open end for charging, and having its other end closed by a wall provided with an extrusion orifice piercing said wall, said orifice being characterized by an elongated narrow slot, and said slot being further characterized by a relatively large key-hole shaped enlargement substantially at the mid-point of its charging opening, and by relatively small enlargements at each end of the slot, the general contour of said extrusion slot from end to end being that of a very broad, rather flat M, having its medial portion formed with a shallow arcuate concavity.

3. A die for extruding materials of the class described, comprising a cup-like body having an open end for charging, and having its other end closed by a wall provided with an extrusion orifice piercing said wall, said orifice being characterized by an elongated narrow slot, and said slot being further characterized by a relatively large enlargement substantially at the mid-point of its charging opening, and by relatively small enlargements at each end of the slot, the general contour of said extrusion slot from end to end being that of a very broad, rather flat M, having its medial portion formed with a shallow arcuate concavity, said enlargements and the intermediate portions of said slot being adapted to cooperate upon a tough dough-like material to extrude a product having a shell-like body portion with transverse constrictions, and with a flaring frilled extension at each end of said body-shell.

4. A die for extruding materials of the class described, comprising a cup-like body having an open end for charging, and having its other end closed by a wall provided with an extrusion orifice piercing said wall, said orifice being characterized by an elongated narrow slot, the breadth of said slot being greater toward the discharging face of said wall, and said slot being further characterized by a relatively large (key-hole shaped) enlargement substantially at the mid-point of its charging opening, and by relatively small enlargements at each end of the slot, the general contour of said extrusion slot from end to end being that of a very broad, rather flat M, having its medial portion formed with a shallow arcuate concavity, said enlargements and the intermediate portions of said slot being adapted to cooperate upon a tough dough-like material to extrude a product having a shell-like body portion with transverse constrictions, and with a flaring frilled extension at each end of said body-shell.

GUIDO TANZI.